(12) United States Patent
Hayashi

(10) Patent No.: US 10,363,694 B2
(45) Date of Patent: Jul. 30, 2019

(54) METHOD OF MANUFACTURING PLATE-INTEGRATED GASKET

(71) Applicant: NOK CORPORATION, Tokyo (JP)

(72) Inventor: Takahiro Hayashi, Fujisawa (JP)

(73) Assignee: NOK Corporation (JP)

( * ) Notice: Subject to any disclaimer, the term of this patent is extended or adjusted under 35 U.S.C. 154(b) by 254 days.

(21) Appl. No.: 15/323,064

(22) PCT Filed: Jun. 2, 2015

(86) PCT No.: PCT/JP2015/065838
§ 371 (c)(1),
(2) Date: Dec. 29, 2016

(87) PCT Pub. No.: WO2016/006366
PCT Pub. Date: Jan. 14, 2016

(65) Prior Publication Data
US 2017/0120488 A1 May 4, 2017

(30) Foreign Application Priority Data
Jul. 10, 2014 (JP) ................................ 2014-142054

(51) Int. Cl.
*B29C 45/14* (2006.01)
*H01M 8/0284* (2016.01)
(Continued)

(52) U.S. Cl.
CPC .. *B29C 45/14065* (2013.01); *B29C 45/14418* (2013.01); *B29C 45/14836* (2013.01);
(Continued)

(58) Field of Classification Search
None
See application file for complete search history.

(56) References Cited

U.S. PATENT DOCUMENTS 6,306,330 B1 * 10/2001 Cerny .................. B29C 43/146
264/255
6,368,536 B1 * 4/2002 Hoepfl ................. B25G 1/105
264/250
(Continued)

FOREIGN PATENT DOCUMENTS

CN          1666370 A     9/2005
CN       102027272 A      4/2011
(Continued)

OTHER PUBLICATIONS

Extended European Search Report for Application No. EP 15 81 9691 dated Jun. 7, 2017 (6 pages).

*Primary Examiner* — Edmund H Lee
(74) *Attorney, Agent, or Firm* — Harness, Dickey & Pierce, P.L.C.

(57) ABSTRACT

A method has the steps of forming a lot of potting portions made of a rubber-like elastic material at appropriate intervals in respect of an extending direction of the gasket main body in the one side in the thickness direction in the peripheral edge portion of the plate in such a manner as to be positioned in a forming area of the gasket main body, next, pinching a portion constructed by the peripheral edge portion of the plate and the potting portion between inner surfaces of a gasket forming cavity of the metal mold and bringing the other side in the thickness direction of the peripheral edge portion into close contact with the one inner surface of the cavity by positioning and arranging the plate within the metal mold and clamping the mold, and filling a liquid rubber material into the cavity and curing the liquid rubber material.

4 Claims, 4 Drawing Sheets

(51) Int. Cl.
*H01M 8/0286* (2016.01)
*B29K 21/00* (2006.01)
*B29K 105/00* (2006.01)
*B29L 31/26* (2006.01)
*B29L 31/34* (2006.01)

(52) U.S. Cl.
CPC ....... *H01M 8/0284* (2013.01); *H01M 8/0286* (2013.01); *B29C 2045/14934* (2013.01); *B29K 2021/00* (2013.01); *B29K 2105/0058* (2013.01); *B29K 2905/00* (2013.01); *B29K 2995/0046* (2013.01); *B29L 2031/265* (2013.01); *B29L 2031/3468* (2013.01)

(56) References Cited

U.S. PATENT DOCUMENTS

| | | | |
|---|---|---|---|
| 6,468,455 | B1 | 10/2002 | Kobayashi |
| 6,579,485 | B2 * | 6/2003 | Smith ................. B29C 45/1657 264/247 |
| 8,609,299 | B2 | 12/2013 | Iju et al. |
| 2005/0118484 | A1 | 6/2005 | Kawachi et al. |
| 2011/0127692 | A1 | 6/2011 | Watanabe |
| 2012/0049409 | A1 | 3/2012 | Guzowski |
| 2013/0154150 | A1 | 6/2013 | Shimazoe et al. |
| 2015/0295210 | A1 | 10/2015 | Horimoto et al. |

FOREIGN PATENT DOCUMENTS

| | | |
|---|---|---|
| CN | 202062577 U | 12/2011 |
| CN | 103079798 A | 5/2013 |
| JP | 2001260694 A | 9/2001 |
| JP | 2001283893 A | 10/2001 |
| JP | 2002-260694 A | 9/2002 |
| JP | 2005-166576 A | 6/2005 |
| JP | 2006-092773 A | 4/2006 |
| JP | 2008-177001 A | 7/2008 |
| JP | 2011096419 A | 5/2011 |
| WO | WO-2012029444 A1 | 3/2012 |
| WO | WO-2014-069172 A1 | 5/2014 |

* cited by examiner

METHOD OF MANUFACTURING PLATE-INTEGRATED GASKET

CROSS-REFERENCE TO RELATED APPLICATIONS

This application is a U.S. National Stage Application of International Application No. PCT/JP2015/065838, filed on Jun. 2, 2015, and published in Japanese as WO 2016/006366 A1 on Jan. 14, 2016. This application claims priority to Japanese Application No. 2014-142054, filed on Jul. 10, 2014. The entire disclosures of the above applications are incorporated herein by reference.

BACKGROUND OF THE INVENTION

Field of the Invention

The present invention relates to a method of manufacturing a plate-integrated gasket which is integrally provided with a gasket main body made of a rubber-like elastic material in a peripheral edge portion of a plate such a separator, for example, constructing a fuel battery cell.

Description of the Conventional Art

In a fuel battery, a fuel battery cell is formed by arranging a gas diffusion layer in both sides in a thickness direction of a membrane electrode assembly (MEA) which is provided with a pair of electrode layers in both surfaces of an electrolyte membrane, and laminating a separator thereon, and the fuel battery is constructed as a stack structure by laminating a lot of fuel battery cells. A gasket for sealing a fuel gas and an oxidation gas is employed in each of the fuel battery cells, and a plate-integrated gasket 100 as shown in FIGS. 5 and 6 has been conventionally known as this kind of gasket.

The plate-integrated gasket 100 shown in FIGS. 5 and 6 is integrally provided with a gasket main body 102 made of a rubber-like elastic material (a rubber material or a synthetic resin material having a rubber-like elasticity) in one side in a thickness direction in a peripheral edge portion of a plate 101 such as a metal separator, and the gasket main body 102 has a seal lip 102a which is formed into a chevron protrusion shape.

When the gasket main body 102 is integrally formed respectively on one surfaces of peripheral edge portions 101a and 101b of the plate 101 by using a metal mold, in manufacturing of this kind of plate-integrated gasket 100, the plate 101 is arranged in such a manner that the peripheral edge portions 101a and 101b are positioned within a cavity which is a shaping space for a molding liquid rubber material, and is pinched between inner surfaces of the metal mold in an intermediate portion 101c between the peripheral edge portions 101a and 101b. Therefore, in the case that the plate 101 is thin and flexible such as the metal separator for the fuel battery, there is a risk that the liquid rubber material filled into the cavity partly comes around a back side of the peripheral edge portions 101a and 101b of the plate 101, and the gasket main body 102 is formed in a state in which the peripheral edge portions 101a and 101b are bent by an inflow pressure of the liquid rubber material (refer to patent document 1). If the worst comes to the worst, there is generated such a problem that the deformed plate 101 is partly exposed from the gasket main body 102, and there has been a risk that a sealing performance of the gasket main body 102 is deteriorated.

SUMMARY OF THE INVENTION

Problem to be Solved by the Invention

The present invention is made by taking the above points into consideration, and a technical object of the present invention is to provide a method of manufacturing a plate-integrated gasket which can effectively prevent deformation of a peripheral edge portion of a plate which is positioned within a cavity when a gasket main body is integrally formed in one side in a thickness direction of the peripheral edge portion of the flexible plate.

Means for Solving the Problem

As a means for effectively solving the technical object mentioned above, a method of manufacturing a plate-integrated gasket according to the present invention is a method of manufacturing a plate-integrated gasket integrally provided with a gasket main body made of a rubber-like elastic material in one side in a thickness direction in a peripheral edge portion of a plate, the method comprising the steps of: forming a lot of potting portions made of a rubber-like elastic material at appropriate intervals in respect of an extending direction of the gasket main body in the one side in the thickness direction in the peripheral edge portion of the plate in such a manner as to be positioned in a forming area of the gasket main body; next pinching a portion constructed by the peripheral edge portion of the plate and the potting portion between inner surfaces of a gasket forming cavity of the metal mold and bringing the other side in the thickness direction of the peripheral edge portion into close contact with the one inner surface of the cavity by positioning and arranging the plate within the metal mold and clamping the mold; and filling a liquid rubber material into the cavity and curing the liquid rubber material.

In the manufacturing method mentioned above, the potting portion made of the rubber-like elastic material and formed in the one side in the thickness direction in the peripheral edge portion of the plate while being positioned in the forming area of the gasket main body is pinched between the inner surfaces of the gasket forming cavity together with the peripheral edge portion of the plate by positioning and arranging the plate within the metal mold and clamping the mold, and the other side in the thickness direction of the peripheral edge portion of the plate is pressed to the one inner surface of the cavity. As a result, it is possible to effectively prevent the peripheral edge portion of the plate from being bent when the liquid rubber material filled in the cavity is shaped, and also effectively prevent the liquid rubber material from partly coming around and entering into the other side in the thickness direction of the peripheral edge portion of the plate in conjunction with the bending deformation.

Since a lot of potting portions are formed at the appropriate intervals along the forming area of the gasket main body in the peripheral edge portion of the plate, the potting portions do not disconnect the gasket forming cavity. Therefore, the flow of the liquid rubber material is not shut off within the cavity as is different from the case that the potting portions are continuously formed. As a result, it is not necessary to increase an inlet for the liquid rubber into the cavity. Further, the potting portions are integrated with the gasket main body which is formed by curing the liquid rubber material filled in the cavity, and form a part of the gasket main body.

Effect of the Invention

According to the method of manufacturing the plate-integrated gasket of the present invention, the other side in the thickness direction of the peripheral edge portion is pressed to the inner surface of the cavity by the potting portions which are formed in the one side in the thickness direction of the peripheral edge portion of the plate. Therefore, it is possible to prevent the peripheral edge portion of the plate from being bent by the inflow pressure of the liquid rubber material which is filled in the cavity and prevent the liquid rubber material from partly coming around the other side in the thickness direction even in the case that the gasket is thin and flexible such as the metal separator of the fuel battery, so that it is possible to improve a quality of the plate-integrated gasket.

DETAILED DESCRIPTION OF PREFERRED EMBODIMENT

A description will be given below of a preferable embodiment obtained by applying a method of manufacturing a plate-integrated gasket according to the present invention to manufacturing of a separator integrated gasket in a fuel battery cell, with reference to the accompanying drawings.

Figure 4:
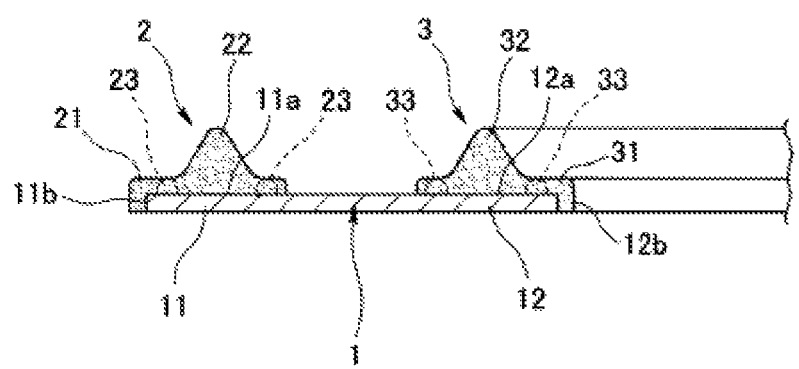
FIG. 4 is a cross sectional view showing a formed plate-integrated gasket by cutting the formed plate-integrated gasket at a position corresponding to FIG. 2, in the preferable embodiment of the method of manufacturing the plate-integrated gasket according to the present invention.
Figure 5:
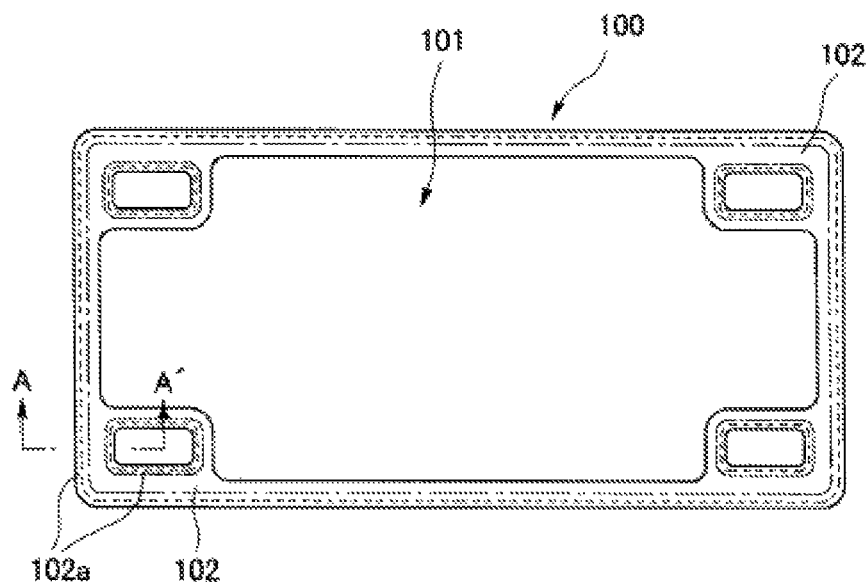
FIG. 5 is a plan view showing a plate-integrated gasket which is manufactured according to the prior art.
Figure 6:
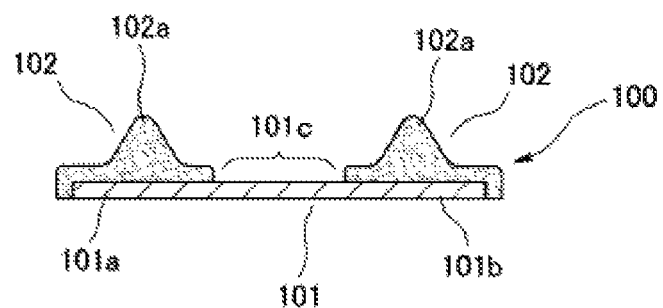
FIG. 6 is a cross sectional view showing the plate-integrated gasket which is manufactured according to the prior art by cutting the plate-integrated gasket at a position along a line A-A' in FIG. 5.
Figure 7:
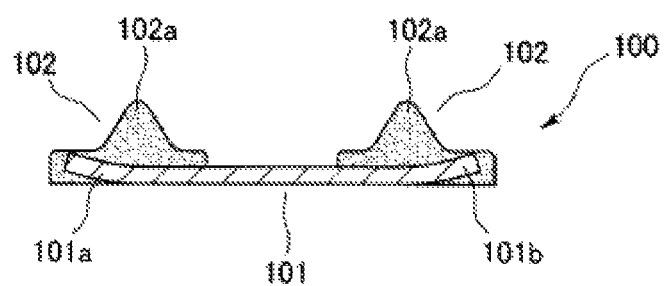
FIG. 7 is a cross sectional view showing a state in which a deformation is generated in a peripheral edge portion of a plate by cutting the plate at the position along the line A-A' in FIG. 5, in the plate-integrated gasket which is manufactured according to the prior art.

FIG. 4 shows an example of a plate-integrated gasket (a separator integrated gasket in a fuel battery cell) which is manufactured according to the present invention. Reference numeral 1 denotes a plate serving as a metal separator which constructs the fuel battery cell, and reference numerals 2 and 3 respectively denote gasket main bodies which are integrally formed in an outer peripheral edge portion 11 of the plate 1, and a peripheral edge portion (hereinafter, refer to as an opening peripheral edge portion) 12 of an opening 1a which is provided as a gas flow path of the fuel battery cell in the plate 1. The outer peripheral edge portion 11 and the opening peripheral edge portion 12 correspond to a peripheral edge portion described in claim 1.

Each of the gasket main bodies 2 and 3 is made of a rubber-like elastic material (a rubber material or a synthetic resin material having a rubber-like elasticity). Among them, the gasket main body 2 is constructed by a plate-like base portion 21 which extends along one side 11a in a thickness direction and an end edge portion 11b of the outer peripheral edge portion 11 of the plate 1, and a seal lip 22 which protrudes like a chevron from an intermediate portion in its width direction, and the gasket main body 3 is constructed by a plate-like base portion 31 which extends along one side 12a in a thickness direction and an end edge portion 12b of the opening peripheral edge portion 12, and a seal lip 32 which protrudes like a chevron from an intermediate portion in its width direction.

The plate-integrated gasket having the structure mentioned above is used as a laminated part which constructs a fuel battery cell, and achieves a sealing function against a fuel gas or an oxidation gas which are supplied to the fuel battery cell, and a water which is created by an electrochemical reaction, by the seal lips 22 and 32 in the gasket main bodies 2 and 3 being brought into close contact with the other laminated parts under an appropriate compression state.

Further, in the manufacturing of the plate-integrated gasket, a lot of potting portions 23 and 33 each of which is made of a rubber-like elastic material are first of all formed in the one sides 11a and 12a in the thickness direction in the outer peripheral edge portion 11 and the opening peripheral edge portion 12 of the plate 1, respectively. In more detail, two rows of potting portions 23 along the outer peripheral edge portion 11 of the plate 1 among the potting portions 23 and 33 are formed so as to be positioned in the area forming the gasket main body 2 in the separator integrated gasket in FIG. 4 described previously, and two rows of potting portions 33 along the opening peripheral edge portion 12 are formed so as to be positioned in the area forming the gasket main body 3 in the separator integrated gasket in FIG. 4.

The potting portions 23 and 33 can be formed in the one sides 11a and 12a in the thickness direction in the outer peripheral edge portion 11 and the opening peripheral edge portion 12 of the plate 11 by applying a liquid rubber material having a low viscosity in a dotted manner at predetermined intervals, for example, in a semispherical build-up shape according to a silk screen printing method, a dispenser method or a blade method, and curing.

Figure 3:
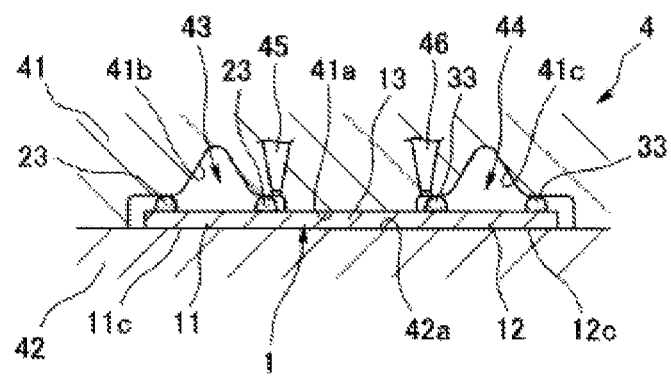
FIG. 3 is a cross sectional view showing a state in which the plate is positioned and arranged within a metal mold and the mold is clamped, by cutting the plate at a position corresponding to FIG. 2, in the preferable embodiment of the method of manufacturing the plate-integrated gasket according to the present invention.

Next, the plate 1 on which the potting portions 23 and 33 are formed according to the step mentioned above is positioned and arranged in a metal mold 4 for forming the gasket, as shown in FIG. 3. The metal mold 4 has split molds 41 and 42 which are brought into contact with and separated from each other, and a cavity 43 and a cavity 44 are defined between facing surfaces thereof by groove-like concave portions 41b and 41c which are formed in an inner surface of the one split mold 41, when the molds are clamped, the cavity 43 being along the outer peripheral edge portion 11 of the plate 1, and the cavity 44 being along the opening peripheral edge portion 12. The cavities 43 and 44 are spaced in which the liquid rubber material for forming the gasket main bodies 2 and 3 shown in FIG. 4 is filled, and are formed into shapes corresponding to the gasket main bodies 2 and 3. Further, mold pressing surfaces 41a and 42a which can pinch a portion 13 between the outer peripheral edge portion 11 and the opening peripheral edge portion 12 in the plate 1 are formed between the cavities 43 and 44.

The one split mold 41 is provided with injection gates 45 and 46 for filling the liquid rubber material respectively in the cavities 43 and 44. The injection gates 45 and 46 are open to positions which do not come into contact with the potting portions 23 and 33 at positions which correspond to the base portions 21 and 31 of the gasket main bodies 2 and 3 shown in FIG. 4 in the inner surfaces of the cavities 43 and 44.

Further, a portion constructed by the outer peripheral edge portion 11 of the plate 1 and the potting portion 23 in the one side 11a in the thickness direction is pinched between the inner surfaces of the cavity 43, a portion constructed by the opening peripheral edge portion 12 of the plate 1 and the potting portion 33 in the one side 12a in the thickness direction is pinched between the inner surfaces of the cavity 44, and a portion 13 between the outer peripheral edge portion 11 and the opening peripheral edge portion 12 is pinched between mold pressing surfaces 41a and 42a of the split molds 41 and 42, by positioning the plate 1 between the split molds 41 and 42 and thereafter clamping the mold 4 (the split molds 41 and 42). As a result, the other side 11c in the thickness direction of the outer peripheral edge portion 11 of the plate 1 is pressed in a close contact state to a surface in the split mold 42 side among the inner surface of the cavity 43, by the potting portion 23 which comes into contact with the surface in the split mold 41 side among the inner surface of the cavity 43, and the other side 12c in the thickness direction of the opening peripheral edge portion 12 of the plate 1 is pressed in a close contact state to the surface in the split mold 42 side among the inner surface of the cavity 44, by the potting portion 33 which comes into contact with the surface in the split mold 41 side among the inner surface of the cavity 44.

The liquid rubber material is injected to the cavities 43 and 44 through the injection gates 45 and 46 after the mold clamping. The same material as that used for forming the potting portions 23 and 33 is employed for the liquid rubber material.

The liquid rubber material injected to the cavity 43 is shaped to a whole area within the cavity 43 through portions between the potting portions 23 which are dotted at the predetermined intervals in the extending direction of the cavity 43, and the liquid rubber material injected to the cavity 44 is shaped to a whole area of the cavity 44 through portions between the potting portions 33 which are dotted at the predetermined intervals in the extending direction of the cavity 44.

At this time, the outer peripheral edge portion 11 of the plate 1 positioned within the cavity 43 is pressed in the close contact state to the surface in the split mold 42 side among the inner surface of the cavity 43 by the potting portion 23, and the opening peripheral edge portion 12 of the plate 1 positioned within the cavity 44 is pressed in the close contact state to the surface in the split mold 42 side among the inner surface of the cavity 44 by the potting portion 33 as mentioned above. As a result, it is possible to effectively prevent the outer peripheral edge portion 11 and the opening peripheral edge portion 12 of the plate 1 from floating up and being bent by the pressure of the liquid rubber material, and also effectively prevent the liquid rubber material from partly coming around the other sides 11c and 12c in the thickness direction of the outer peripheral edge portion 11 and the opening peripheral edge portion 12 and entering thereinto.

Further, since the liquid rubber material is bridged and cured within the cavities 43 and 44, the gasket main bodies 2 and 3 which are integrated with the plate 1 and are made of the rubber-like elastic material are formed as shown in FIG. 4. At this time, the potting portions 23 and 33 made of the same rubber-like elastic material are integrated as parts of the gasket main bodies 2 and 3 as shown by broken lines in FIG. 4. Further, the outer peripheral edge portion 11 and the opening peripheral edge portion 12 of the plate 1 do not float up and are not bent in the process of forming the gasket main bodies 2 and 3 as mentioned above, and such a forming defect that the outer peripheral edge portion 11 and the opening peripheral edge portion 12 are exposed from the gasket main bodies 2 and 3 is not accordingly generated. As a result, it is possible to obtain the plate-integrated gasket having a high quality.

The potting portions 23 and 33 are preferably arranged at equal intervals (for example, 30 mm or less) in the portions where the outer peripheral edge portion 11 or the opening peripheral edge portion 12 of the plate 1 extends linearly, and are preferably arranged more closely (for example, 20 mm or less) in the portions (the corner portions) where the outer peripheral edge portion 11 or the opening peripheral edge portion 12 forms curves. Because the thin and flexible plate 1 tends to generate deformation in the curved portion when the plate 1 is pinched between the mold pressing surfaces 41a and 42a of the metal mold 4. Therefore, it is possible to effectively suppress the deformation by making the intervals between the potting portions 23 and 33 closer in the curved portions.

Figure 1:
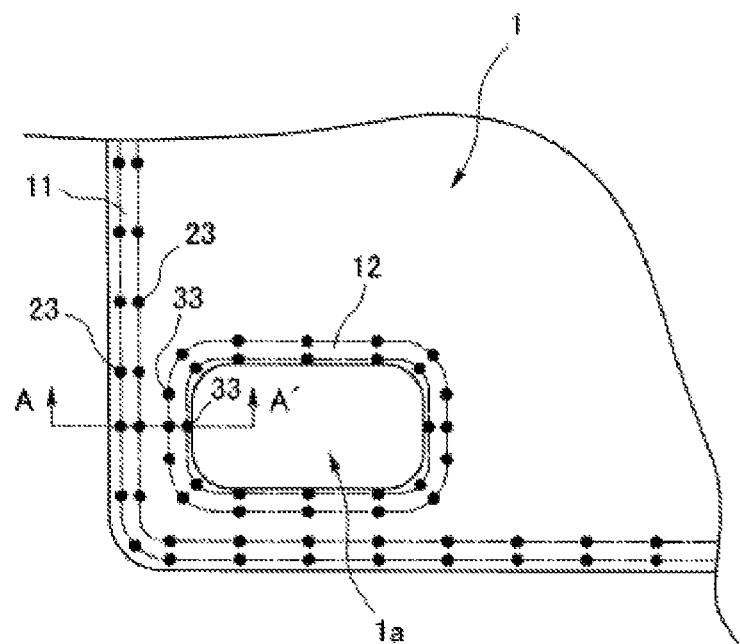
FIG. 1 is a partly plan view showing an example of an arrangement of a potting portion which is formed in a peripheral edge portion of a plate in a preferable embodiment of a method of manufacturing a plate-integrated gasket according to the present invention.
Figure 2:
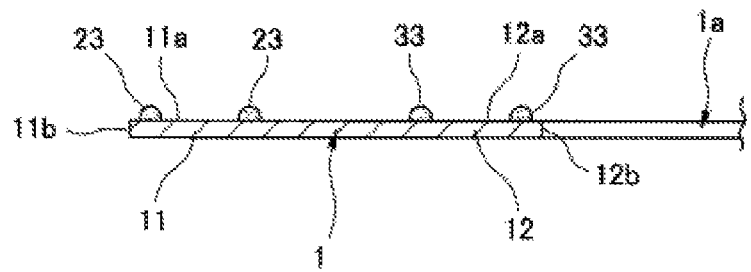
FIG. 2 is a cross sectional view showing the plate by cutting the plate at a position along a line A-A' in FIG. 1 in the preferable embodiment of the method of manufacturing the plate-integrated gasket according to the present invention.

In the illustrated embodiment, the description is given on the assumption that the potting portions 23 and 33 are formed into the spherical build-up shape, however, the potting portions 23 and 33 may be intermittent with appropriate lengths in a direction (a direction shown by a one-dot chain line in FIG. 1) which is along the outer peripheral edge portion 11 and the opening peripheral edge portion 12 of the plate 1. In this case, a hog-backed shape or a chevron cross sectional shape may be thought.

Further, a membrane electrode assembly of the fuel battery cell or a synthetic resin film provided in an outer periphery of the membrane electrode assembly can be applied as the plate 1, in addition to the metal separator of the fuel battery cell.

What is claimed is:

1. A method of manufacturing a plate-integrated gasket that includes a plate having an upper major surface and a lower major surface, and a gasket main body made of a rubber material formed on the upper major surface thereof, the method comprising the steps of:

forming a plurality of discrete potting portions made of the rubber material on the upper major surface of the plate at predetermined intervals along a peripheral edge of the plate at locations that correspond to a location at which the gasket main body will be formed on the upper major surface of the plate;

after forming the plurality of discrete potting portions on the plate, placing the plate in a metal mold that includes a pair of split molds that collectively define a cavity that is configured for receipt of the rubber material that forms the gasket main body, pinching the plate such that an inner surface of one of the pair of split molds that faces the upper major surface of the plate contacts the discrete potting portions and an inner surface of the other of the pair of split molds that faces the lower major surface of the plate contacts the peripheral edge of the plate, and clamping the mold; and after clamping the mold, providing the rubber material in a liquid form into the cavity and then curing the rubber material.

2. The method according to claim 1, wherein the discrete potting portions are formed as hemispherical dots on the upper major surface of the plate.

3. The method according to claim 1, wherein the step of providing the rubber material in a liquid form into the cavity surrounds each of the discrete potting portions such that the discrete potting portions form part of the gasket main body after the rubber material is cured.

4. The method according to claim 1, wherein the contact between the discrete potting portions and the inner surface of the one split mold and the contact between the peripheral edge of the plate and the inner surface of the other split mold prevents deformation of the peripheral edge.

* * * * *